May 8, 1951 W. R. VREELAND 2,551,652
MACHINE FOR INSERTING A GLASS TUBE INTO A STOPPER
Filed Feb. 21, 1950

Inventor:
WALTER R. VREELAND
by Roy C. Hackley, Jr.
Attorney

Patented May 8, 1951

2,551,652

UNITED STATES PATENT OFFICE 2,551,652

MACHINE FOR INSERTING A GLASS TUBE INTO A STOPPER

Walter R. Vreeland, Boulder City, Nev., assignor to the United States of America as represented by the Secretary of the Interior Application February 21, 1950, Serial No. 145,513

2 Claims. (Cl. 29—237)

(Granted under the act of March 3, 1883, as amended April 30, 1928; 370 O. G. 757)

The invention described herein may be manufactured and used by or for the Government of the United States for governmental purposes without payment to me of any royalty thereon in accordance with the provisions of the act of April 30, 1928 (ch. 460, 45 Stat. 467).

My invention relates to the insertion of glass tubing through perforations in rubber or cork stoppers and particularly to a machine for this purpose which eliminates hazard of a laboratory employee being accidentally cut by the breaking of glass tubing when this is done manually by the method in common use in laboratories.

Figure 1:
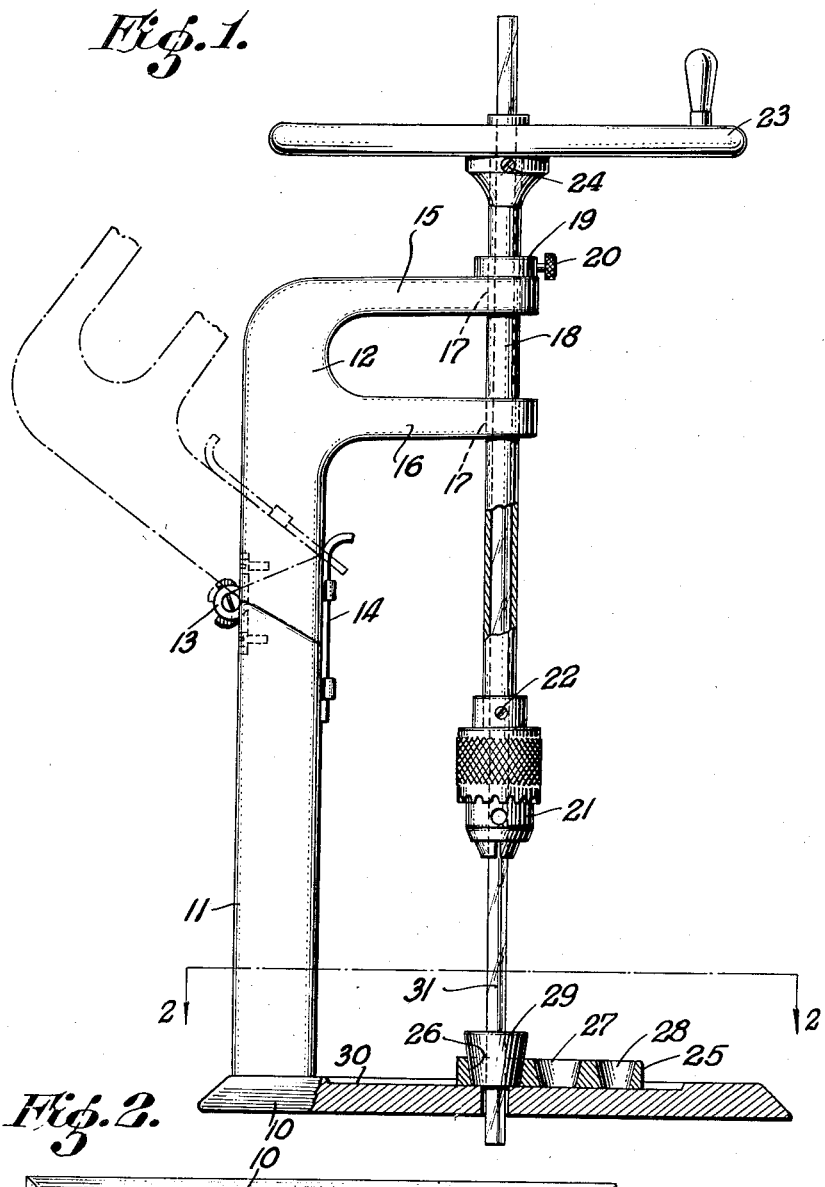
Figure 2:
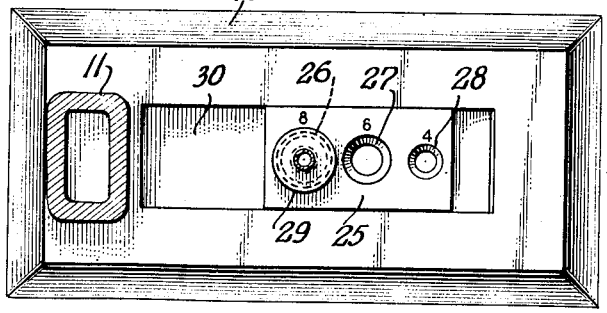

In the accompanying drawings which illustrate a preferred embodiment of my invention:

Figure 1 is a side elevation of my device.
Figure 2 is a section on the line 2—2, Fig. 1.

In these drawings:

A base 10 rigidly supports a lower frame member 11 which in turn supports an upper frame member 12 to which it is connected by a hinge 13 and a latching member 14.

The member 12 has one or more laterally extending arms 15; 16 provided with a tube aligning passage 17 for supporting tube 18 to which is clamped a stop collar 19 provided with a clamping thumb screw 20. A clamping screw chuck 21 is detachably secured to the tube 18 by a suitable set screw 22 while a suitable turning wheel 23 is detachably united to the tube 18 by a suitable keylock 24.

A base plate 25 provided with a plurality of tapered holes 26; 27; 28 for receiving perforated stoppers 29 is mounted to slide within suitable recess 30 in the base 10. The glass tube 31 to be inserted in the stopper 29 is inserted through the tube 18 and clamped by means of the screw chuck 21.

The operation of my device is as follows:

With my device arranged as shown in Figure 1, except for the omission of the glass tubing 31, with the screw chuck in releasing position:

A section of glass tubing is threaded through the tube 18 and chuck 21 until it rests upon the stopper 29. The chuck 21 may then be clamped around the tubing 31 and the stop collar thumb screw 20 may be released. Then by applying pressure and rotary or oscillating motion through the turning wheel 23 the tubing may be safely forced through the perforation in the stopper 29 until the glass tubing extends a predetermined distance below the stopper 29 when the chuck 21 may be released to permit the withdrawal of the tubing 31 and the encircling stopper 29. After the lower end of the glass tubing has cleared the base plate 25 the latch 14 may be released and the upper frame member 12 may be swung on the hinge 13 to permit the withdrawal of the tubing 31 and surrounding stopper 29.

It should be understood that the present disclosure is for the purpose of illustration only, and that the invention includes all modifications and equivalents which fall within the spirit and scope of the appended claims, in which it is my intention to claim all novelty inherent in my invention as broadly as possible in view of the prior art.

What I claim is:

1. A machine for inserting a tube through a hole in a stopper which includes a supporting frame having a laterally extending arm provided with a tube aligning passage parallel with the axis of said frame, a bifurcated base for said frame, a plate provided with a plurality of tapered apertures of different diameters, mounted in said bifurcated base, a supporting tube revolubly mounted in said passage of said frame, a stop collar provided with means for clamping it to said tube, and a glass tube clamping chuck rigidly secured to the lower end of said tube.

2. A machine for inserting a tube through a hole in a stopper which includes a supporting frame provided with two laterally extending arms each provided with passages having a common axis parallel with the axis of said frame, a hinged joint in said frame provided with a latch release, a base provided with guiding means for a sliding plate, a plate provided with a plurality of tapered apertures of different diameters adapted to slide into said guiding means of said base, a supporting tube revolubly mounted in said passages of said frame, a stop collar provided with means for clamping it to said tube, and a glass tube clamping chuck rigidly secured to the lower end of said tube.

WALTER R. VREELAND.

REFERENCES CITED

The following references are of record in the file of this patent:

UNITED STATES PATENTS

| Number | Name | Date |
|---|---|---|
| 259,892 | Metten | June 20, 1882 |
| 278,612 | Sharp | May 29, 1883 |
| 317,336 | Glenn | May 5, 1885 |
| 404,367 | Stearns | May 28, 1889 |
| 1,544,393 | Hatcher | June 30, 1925 |
| 2,510,878 | Fairbairn | June 6, 1950 |